United States Patent
Shinkai

(10) Patent No.: US 7,515,554 B2
(45) Date of Patent: Apr. 7, 2009

(54) HALF-DUPLEX COMMUNICATION CONTROL METHOD

(75) Inventor: Koichi Shinkai, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 526 days.

(21) Appl. No.: 10/500,609

(22) PCT Filed: May 9, 2003

(86) PCT No.: PCT/JP03/05833

§ 371 (c)(1),
(2), (4) Date: Jul. 1, 2004

(87) PCT Pub. No.: WO2004/100484

PCT Pub. Date: Nov. 18, 2004

(65) Prior Publication Data

US 2005/0078617 A1    Apr. 14, 2005

(51) Int. Cl.
*H04B 1/44* (2006.01)
(52) U.S. Cl. ............... 370/282; 370/395.21; 370/395.3
(58) Field of Classification Search .......... 370/282
See application file for complete search history.

(56) References Cited

U.S. PATENT DOCUMENTS

| | | | | |
|---|---|---|---|---|
| 4,459,589 A | * | 7/1984 | Ito | 340/825.52 |
| 4,669,090 A | * | 5/1987 | Betts et al. | 375/222 |
| 4,894,847 A | * | 1/1990 | Tjahjadi et al. | 375/377 |
| 4,903,280 A | * | 2/1990 | Lang et al. | 375/220 |
| 5,396,486 A | * | 3/1995 | Scott | 370/296 |
| 2003/0002519 A1 | * | 1/2003 | Terry et al. | 370/445 |

FOREIGN PATENT DOCUMENTS

| | | |
|---|---|---|
| EP | 02 35 648 B1 | 9/1987 |
| JP | 58-111543 A | 7/1983 |
| JP | 60-41844 A | 3/1985 |
| JP | 60-041844 A | 3/1985 |
| JP | 61-269762 A | 11/1986 |
| JP | 6-244826 A | 9/1994 |
| JP | 2002-101076 A | 4/2002 |

\* cited by examiner

*Primary Examiner*—Chirag G Shah
*Assistant Examiner*—Salvador E Rivas
(74) *Attorney, Agent, or Firm*—Sughrue Mion, PLLC

(57) ABSTRACT

A half-duplex communication control method according to this invention is constructed so that in a half-duplex communication control method in which two devices connected by two signal lines are had and half-duplex communication in one-to-one correspondence is conducted, the first device outputs a sending request output for providing notification of a state of a communication request to the second device as a sending request signal using an open collector buffer and also turns back its sending request output inside the self device to check a communicable state as a sending request input and also in the case of being receivable with respect to the sending request signal sent from the opponent device, the second device outputs a sending permission output for providing notification of a communicable state to the first device as a sending permission signal using an open collector buffer and also turns back its sending permission output inside the self device to check a communicable state as a sending permission input, and since each the device decides sending permission by an output from the opponent device, sending is performed after checking whether the opponent device is receivable, so that both the devices are prevented from starting sending simultaneously.

2 Claims, 3 Drawing Sheets

HALF-DUPLEX COMMUNICATION CONTROL METHOD

TECHNICAL FIELD

This invention relates to a control method of half-duplex communication in one-to-one correspondence using a cable, and relates to a communication control method for preventing both two devices from starting sending simultaneously.

BACKGROUND ART

An operation of devices for conducting conventional half-duplex communication will be described below.

The device outputs a sending request signal at the time of starting sending and when the sending request signal is outputted, the sending request signal is inputted to a sending permission signal of the self device, so that it is decided that sending can be performed, and data sending is started at once.

However, in the operation described above, two devices run asynchronously, so that sending may be started simultaneously from both of the devices. In this case, a carrier detection signal is inputted to both of the two devices after starting the sending, and at this time, either device suspends the sending by setting of a priority preset.

The device, which suspends the sending, releases the sending request signal and receives data sent from the opponent device and after the completion of the receiving, the device again outputs a sending request signal and resumes the sending.

The device, which wants to start sending, outputs a sending request signal, and its signal is inputted as a receiving-request signal of the opponent device.

When the receiving request signal is inputted, a device of the receiving side outputs a receivable signal since receiving can be performed unless the device of the receiving side is in sending, and its signal is inputted as a sending permission signal of a device of the sending side.

The device of the sending side starts sending of data after the sending permission signal is inputted, so that the two devices can be prevented from starting sending simultaneously by stopping an output of the receivable signal even when the sending request signals are outputted from two ways.

Also, as another conventional example, as shown in JP-A-60-41844 as one example, there is an example of making an error determination when a receivable signal (permission signal) is not inputted within a predetermined time after a sending request signal (channel acquisition request signal) is outputted from a self device.

In the conventional half-duplex communication control method, as small as two control signal lines necessary inside a cable will suffice, but a sending request signal output is used as a sending permission signal input of the self device, so that there was a problem that when sending request signals are simultaneously outputted from the two devices, it may be decided that both the two devices are capable of sending and sending may be started simultaneously from the two devices.

Also, as an operation at the time of sending simultaneously from the two devices, setting of "sending continuation" is previously made in one device and setting of "sending suspension" is made in the other device and thereby at the time of simultaneous sending, sending from the device in which the setting of "sending continuation" is made can be performed, but there was a problem that a setting mistake of the case of setting "sending suspension" or the case of setting "sending continuation" in both the devices cannot be detected.

Also, in the case of another conventional example described above, sending is started after the device of the sending side checks a signal as to whether the opponent device is receivable, so that sending is not started simultaneously from the two devices, but there were problems that since it is necessary to use four signal lines inside a cable as a control signal, the cable thickens and wiring of the cable becomes worse or a price of the cable increases.

Further, there were problems that since a control signal line is monitored by H/W, a complicated circuit for monitoring becomes necessary and a size of a communication device becomes large or a price of the communication device increases.

Therefore, this invention is implemented to solve the problems described above, and an object of the invention is to provide a half-duplex communication control method in which both devices are prevented from starting sending simultaneously and also previous settings of a priority etc. are unnecessary.

DISCLOSURE OF THE INVENTION

This invention provides a half-duplex communication control method constructed so that in a half-duplex communication control method in which a first device and a second device connected to this first device by two signal lines are had and each of the two devices notifies the opponent device of a state as to whether the self device is communicable and half-duplex communication in one-to-one correspondence is conducted, the first device outputs a sending request output for providing notification of a state of a communication request from the first device to the second device as a sending request signal using an open collector buffer and also turns back its sending request output inside the first device to check a communicable state as a sending request input inside the first device and also in the case that the second device is receivable with respect to the sending request signal sent from the first device, the second device outputs a sending permission output for providing notification of a communicable state from the second device to the first device as a sending permission signal using an open collector buffer and also turns back its sending permission output inside the second device to check a communicable state as a sending permission input inside the second device.

Therefore, each the device is constructed so as to decide sending permission by an output from the opponent device, so that sending after checking whether the opponent device is receivable or not can be performed, and both the devices can be prevented from starting sending simultaneously.

Also, this invention randomly determines time respectively varying with respect to two devices by a program of a microcomputer with regard to time which elapses before outputting another sending request output in the case of outputting sending request outputs simultaneously from the two devices.

Therefore, the time which elapses before each the device again outputs the sending request output is varied in the two devices and thereby, a state in which the simultaneous sending request outputs of the two devices compete and communication cannot be conducted can be prevented from continuing.

BEST MODE FOR CARRYING OUT THE INVENTION

First Embodiment

A preferred embodiment of this invention will be described using the drawings.

Figure 1:
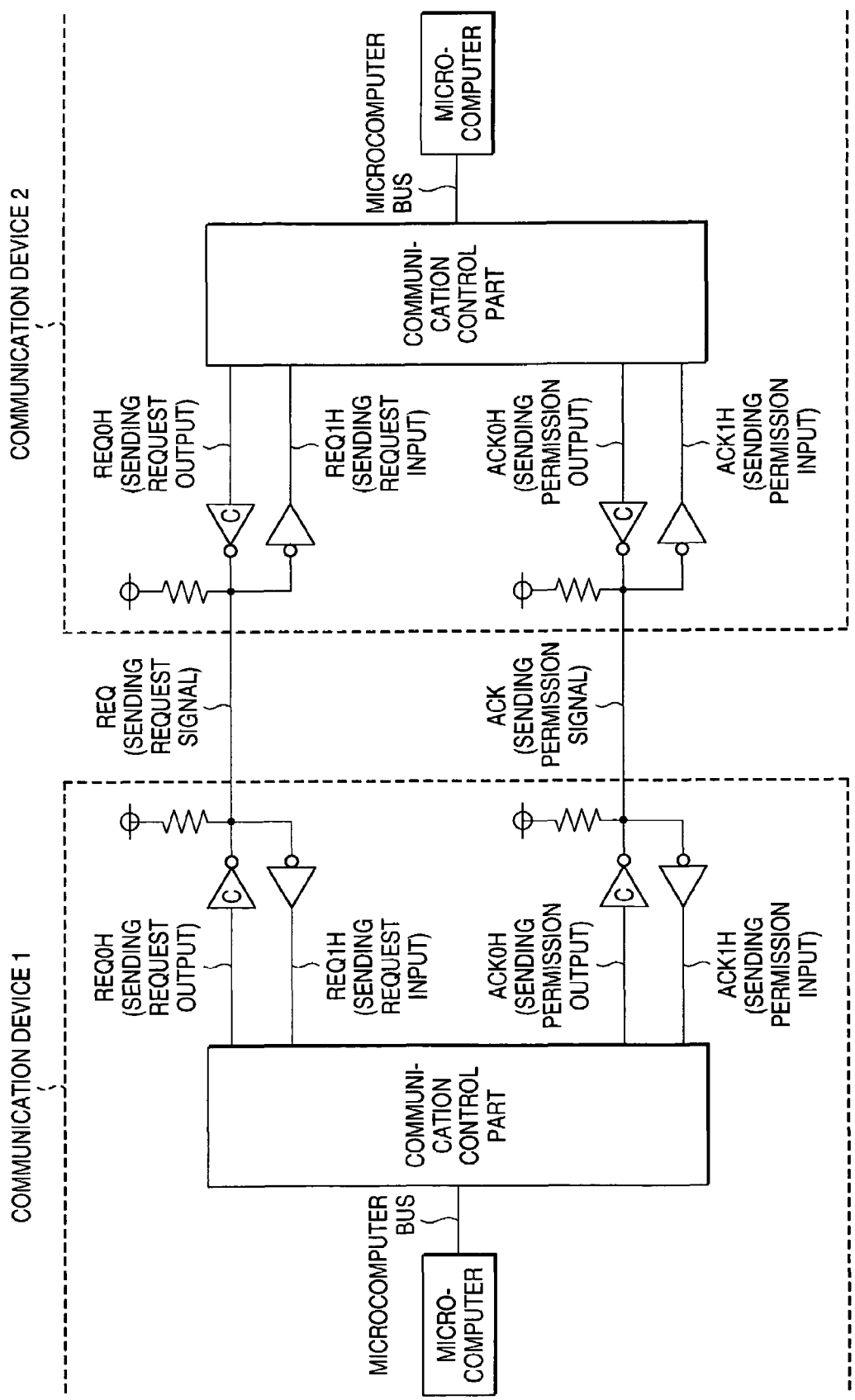
FIG. 1 is a block diagram showing wiring and a configuration of devices for conducting half-duplex communication according to this invention.

FIG. 1 is a block diagram showing wiring and a configuration of devices for conducting half-duplex communication using a cable in this invention and in the same figure, a sending request output (REQOH) of each communication device is a signal in which H is outputted at the time of sending from the self device to the opponent device and a sending request input (REQIH) is a signal in which H is inputted at the time of sending from the opponent device to the self device or the time of sending from the self device to the opponent device.

In a manner similar to the above, a sending permission output (ACKOH) of each the device is a signal in which H is outputted at the time of permitting sending from the opponent device to the self device and a sending permission input (ACKIH) is a signal in which H is inputted at the time of permitting sending from the opponent device to the self device or the time of permitting sending from the self device to the opponent device.

REQ is a signal inside a cable for making connection between the two communication devices, and is a signal which becomes L when at least either device shifts the sending request output to H, and is a signal for connecting signals passing through buffers of open collectors from the sending request outputs of each of the devices. When both the two devices shift the sending request outputs to L, an output of the buffer becomes Z (high impedance) but the REQ becomes H by a pull-up resistor inside the communication device.

In a manner similar to the above, ACK is a signal inside the cable for making connection between the two communication devices, and is a signal which becomes L when at least either device shifts the sending permission output to H, and is a signal for connecting signals passing through buffers of open collectors from the sending permission outputs of each of the devices. When both the two devices shift the sending permission outputs to L, the ACK becomes H by a pull-up resistor inside the communication device.

Figure 2:
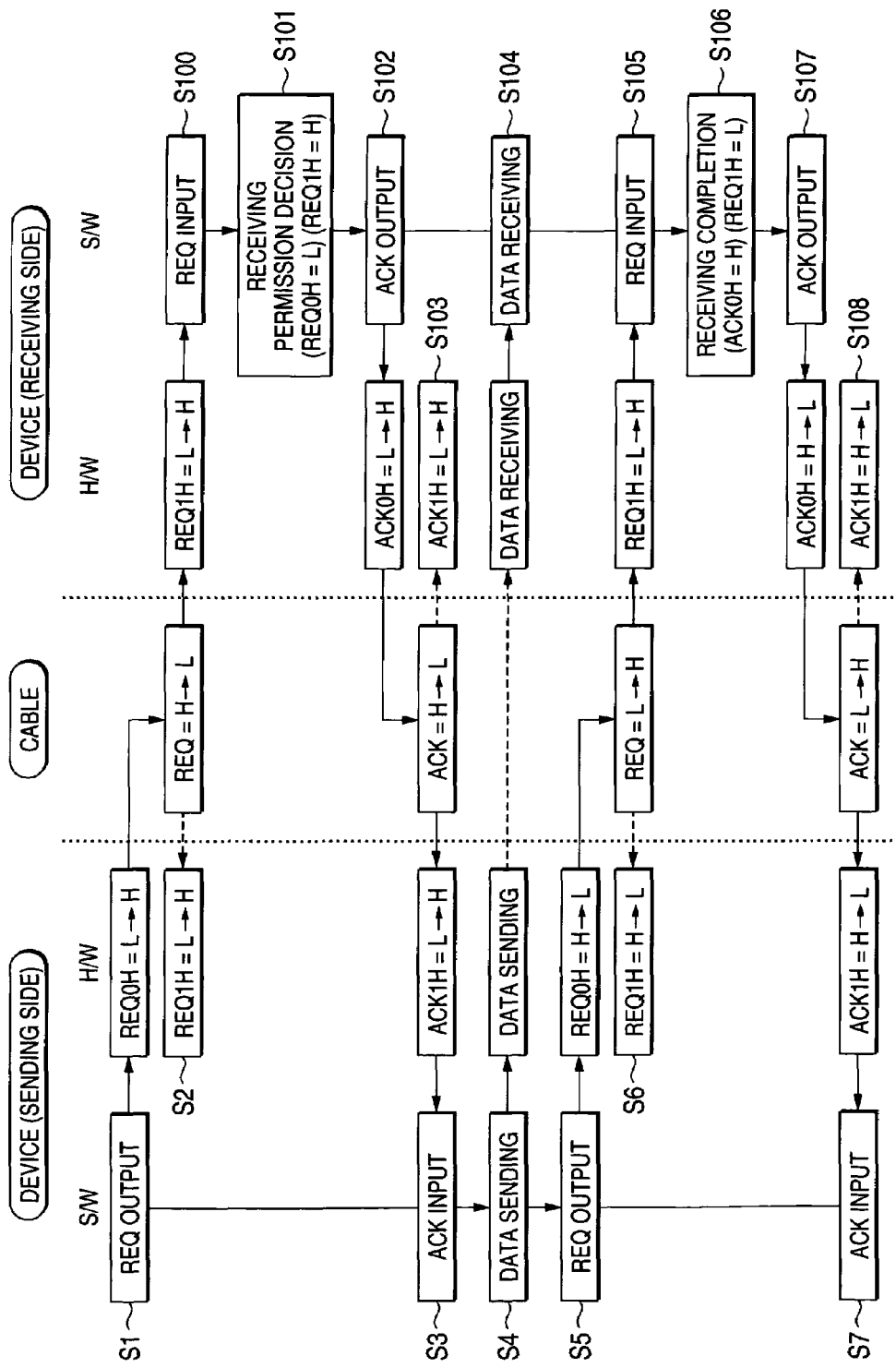
FIG. 2 is a flowchart showing an operation of control signals at the time of normal communication according to this invention.
Figure 3:
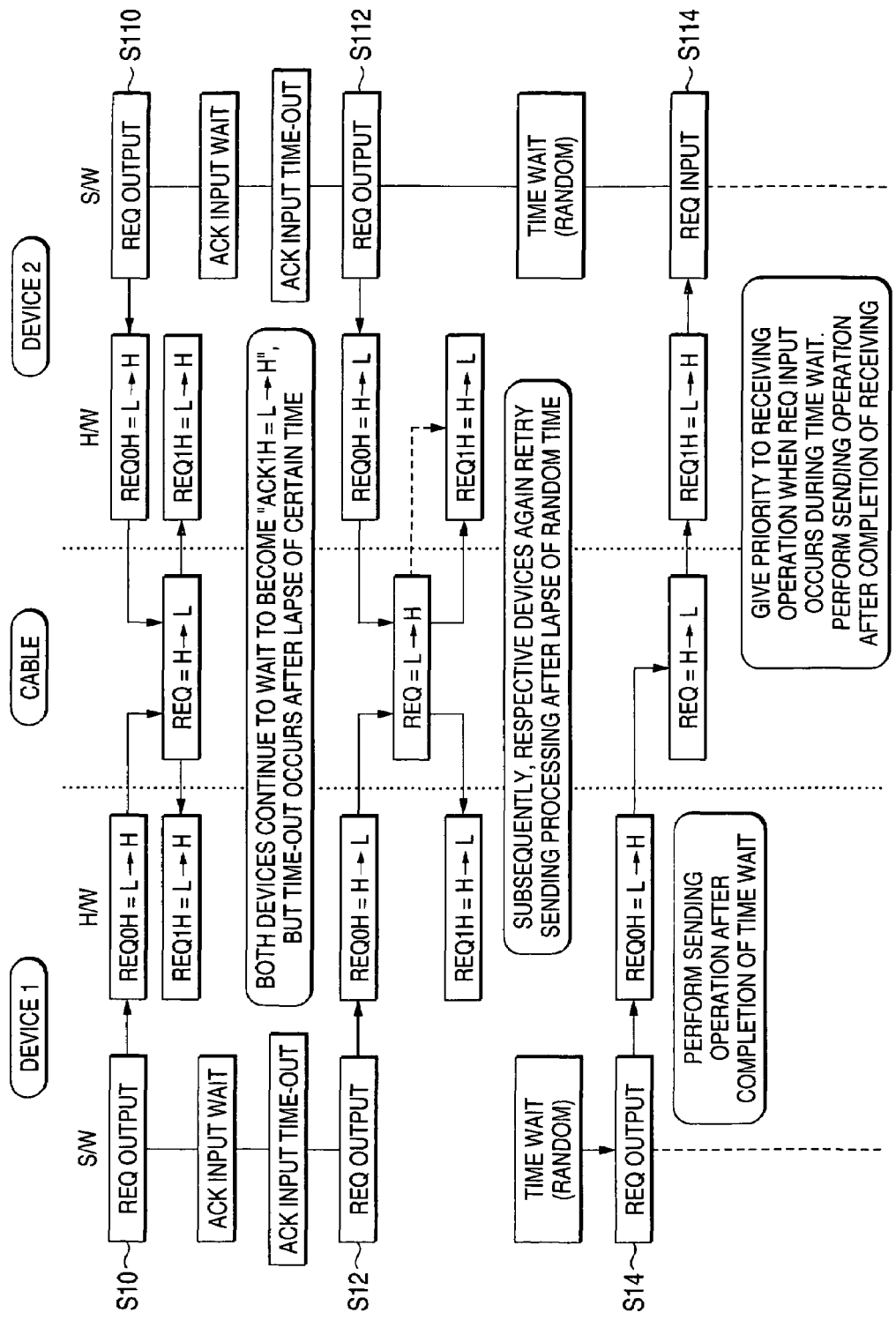
FIG. 3 is a flowchart showing an operation of control signals at the time of communication competition according to this invention.

Next, an operation of the case of this embodiment will be described below with reference to flowcharts of FIGS. 2 and 3.

A sending request output and a sending permission output of each the device are normally L, and REQ and ACK become H by pull-up resistors inside the devices since outputs of buffers of open collectors are Z.

In the above state, the REQ and ACK are H, so that L is inputted to a sending request input and a sending permission input by inverter buffers.

When a communication device 1 sends to a communication device 2, the communication device 1 first shifts the sending request output to H (S1). As a result of this, REQ becomes L, so that H is inputted to the sending request inputs of the communication device 1 and the communication device 2 (S2, S100).

The device in which H is inputted to the sending request input decides whether the device is in the sending side or the receiving side by a state of the sending request output of the self device. When H has been outputted to the sending request output which is a state of the communication device 1, the device is in a sending permission request (sending side) with respect to the opponent device, so that there is nothing to perform, but when L has been outputted to the sending request output which is a state of the communication device 2, the device is in a sending permission request (receiving side) from the opponent, so that H is outputted to the sending permission output when the self device is receivable (S101, S102).

The receiving side communication device outputs H to the sending permission output and thereby ACK becomes L, so that H is inputted to the sending permission inputs of the communication device 1 and the communication device 2 (S3, S103).

When H is inputted to the sending permission input, the sending side communication device which outputs H to the sending request output decides that the opponent device is receivable, and starts sending of data (S4). Also, the receiving side communication device starts receiving of data (S104).

When the sending is completed, the communication device of the sending side shifts the sending request output to which H has been outputted to L (S5). As a result of this, REQ becomes H and the sending request inputs in the communication devices of the sending side and the receiving side become L (S6, S105).

In the communication device of the receiving side, the sending request input to which H has been inputted changes to L and thereby it is decided that the sending from the opponent device is completed (S106), and the sending permission output to which H has been outputted is shifted to L (S107). As a result of this, ACK becomes H and the sending permission inputs in the communication devices of the sending side and the receiving side become L (S7, S108) and the devices return to an initial state.

When the sending permission input does not become H for a certain time in a state in which the sending side device has outputted H to the sending request output, it is decided that the opponent device is not receivable, and the sending side device returns the sending request output to L once and after a while, an operation of a sending request is again performed.

When H is outputted to sending request outputs simultaneously from both the devices (S10, S110), sending request inputs become H in both the devices, but since H is outputted to the sending request outputs, it is decided that the devices are in a sending permission request (sending side), and H is not outputted to sending permission outputs, so that both the devices decide that the opponent device is not receivable by the operation described above, and the sending request outputs are returned to L (S12, S112) and after a while, an operation of a sending request is again performed (S14, S114).

By directly controlling the sending request output through a microcomputer bus from a microcomputer, time which elapses before the device which has returned the sending request output to L again shifts the sending request output to H can be determined by the microcomputer. As a result of this, the time which elapses before each the device again outputs the sending request output is randomly determined by a program of the microcomputer and subsequently, a state in which the sending request outputs of the two devices compete simultaneously and communication cannot be conducted is prevented from continuing.

As described above, according to this invention, each the device is constructed so as to decide sending permission by an output from the opponent device, so that sending after checking whether the opponent device is receivable or not can be performed, and a communication error due to a start of simultaneous sending from both the devices can be prevented.

INDUSTRIAL APPLICABILITY

As described above, a half-duplex communication control method according to this invention is suitable for use in communication of FA devices and so on.

The invention claimed is:

1. A half-duplex communication control method in which a first device and a second device are connected by two signal lines and each of the first device and second device notifies the other device of a state related to whether each device is communicable, and half duplex communication in one-to-one correspondence is conducted, said method comprising:

the first device outputting a sending request output for providing notification of a state of a communication request from the first device to the second device as a sending request signal using an open collector buffer and also turning back said sending request output inside the first device to check a communicable state inside the first device, and if the second device is receivable with respect to the sending request signal sent from the first device, the second device outputting a sending permission output for providing notification of a communicable state from the second device to the first device as a sending permission signal using an open collector buffer and also turning back said sending permission output inside the second device to check a communicable state inside the second device.

2. A half duplex communication control method as defined in claim 1, wherein after outputting sending request outputs simultaneously from said first device and said second device, respective times of said first device and said second device which elapses before outputting another sending request output vary and are randomly determined by a program of a microcomputer.

* * * * *